United States Patent
Liu et al.

(10) Patent No.: US 7,512,397 B2
(45) Date of Patent: *Mar. 31, 2009

(54) BATTERY COVER ASSEMBLY

(75) Inventors: Ye Liu, Shenzhen (CN); Tai-Jun Liu, Shenzhen (CN); Hsiao-Hua Tu, Tu-Cheng (TW); Chia-Hua Chen, Tu-Cheng (TW)

(73) Assignees: Shenzhen Futaihong Precision Industry Co., Ltd., ShenZhen, Guangdong Province (CN); Sutech Trading Limited, Tortola (VG)

( * ) Notice: Subject to any disclaimer, the term of this patent is extended or adjusted under 35 U.S.C. 154(b) by 500 days.

This patent is subject to a terminal disclaimer.

(21) Appl. No.: 11/303,355

(22) Filed: Dec. 16, 2005

(65) Prior Publication Data

US 2006/0148442 A1 Jul. 6, 2006

(30) Foreign Application Priority Data

Dec. 30, 2004 (CN) .................... 2004 2 0103595 U

(51) Int. Cl.
*H04B 1/08* (2006.01)
(52) U.S. Cl. .................. 455/347; 455/90.3; 455/348; 455/575.1; 455/575.4; 455/575.8; 361/616; 361/667; 361/725; 429/97; 429/100; 439/500
(58) Field of Classification Search ............. 455/90.3, 455/347, 348, 349, 550.1, 575.1, 575.4, 575.8; 361/616, 667, 724–727, 747, 769; 429/97, 429/100; 439/500
See application file for complete search history.

(56) References Cited

U.S. PATENT DOCUMENTS

| 5,716,730 | A * | 2/1998 | Deguchi ................. 429/97 |
| 5,895,729 | A * | 4/1999 | Phelps et al. ............. 429/97 |
| 6,660,427 | B1 * | 12/2003 | Hukill et al. ............. 429/97 |
| 6,847,806 | B2 * | 1/2005 | Curtis et al. ............. 455/90.3 |
| 2001/0049292 | A1 * | 12/2001 | Strawn et al. ............ 455/550 |
| 2004/0192418 | A1 * | 9/2004 | Nam .................... 455/575.1 |
| 2004/0204001 | A1 * | 10/2004 | Chen et al. .............. 455/550.1 |
| 2004/0204176 | A1 * | 10/2004 | Park .................... 455/572 |
| 2005/0130030 | A1 * | 6/2005 | Watanabe et al. ......... 429/100 |

* cited by examiner

*Primary Examiner*—Edward Urban
*Assistant Examiner*—Junpeng Chen
(74) *Attorney, Agent, or Firm*—Steven M. Reiss

(57) ABSTRACT

A battery cover assembly (100) includes a housing (30), fixing assembly (40), cover (10) and button (20). The housing includes a receptacle (33) in a middle portion thereof; and two latch slots (37) defined in a bottom portion thereof The base board (50) is fixed to the housing, and with the housing defines a receiving cavity. The fixing assembly includes a sliding frame (41), slidably attached on the base board, and an elastic member (44). The sliding frame has a multiple clasps (423, 432). The cover is configured to be removable attached to the housing and defines a button slot (11) therein. The cover has a multiple claws (12, 13) and two latches (14). The button is mounted to the housing and cooperates with the sliding frame, the button extending through the button slot so as to be exposed to a user.

11 Claims, 5 Drawing Sheets

BATTERY COVER ASSEMBLY

BACKGROUND OF THE INVENTION

1. Field of the Invention

The present invention generally relates to battery cover assemblies and, more particularly, to a battery cover used in a portable electronic device.

2. Discussion of the Related Art

As power supplies, batteries are widely used in portable electronic devices, such as personal digital assistants (PDAs), mobile phones, and so on. A battery is generally removably mounted in a receptacle of a housing of an electronic device. The receptacle is generally covered by a battery cover. When the battery is damaged or cannot be recharged any more, the cover is removed from the housing, whereupon the battery can be taken out and replaced with a new one.

A latching mechanism is generally employed in a conventional battery cover, in order to engage with a housing of the portable electronic device. For example, a battery cover of an Alcatel® OT310 mobile phone includes a latching mechanism. The latching mechanism incorporates a pair of hooks arranged at a lower end of the battery cover and a locking pin arranged at an upper end of the battery cover. Correspondingly, a pair of slots is defined at a lower end of a back side of the housing, and a locking hole is defined at an upper end of the back side. In assembly, the hooks are inserted into the corresponding slots. Then, the battery cover is pressed downwardly such that the locking pins of the battery cover are inserted into the corresponding locking holes of the housing. The battery cover is thus assembled to the housing of the mobile phone. The battery cover is simple in structure, and the engagement between the battery cover and the housing of the mobile phone is secure. However, during disassembly of the cover from the housing of the mobile phone, the battery cover is liable to be damaged because great force, relatively speaking, has to be exerted on the battery cover to detach the battery cover from the housing of the mobile phone. As a result, it is inconvenient for a user to change a battery.

What is needed, therefore, is a new battery cover assembly for a portable electronic device which makes it convenient for a user to detach a battery cover of the battery cover assembly from a housing of the portable electronic device.

SUMMARY OF THE INVENTION

A battery cover assembly used in a portable electronic device includes a housing, a fixing assembly, a cover, and a button. The housing includes a receptacle in a middle portion thereof, and a pair of latch slots defined in a bottom portion thereof. The base board is fixed to the housing, and the base board and the housing together define a receiving cavity therebetween. The fixing assembly includes a sliding frame, slidably attached on the base board, and an elastic member. The sliding frame has a plurality of clasps. The cover can be attached to the housing and has a button slot therein. The cover has a plurality of claws and a pair of latches. The button is mounted to the housing and cooperates with the sliding frame, the button extending through the button slot so as to be exposed to a user.

A main advantage of the battery cover assembly is that the battery cover assembly is connected so that the cover and the housing are integrated together, to be a complete unit. Therefore, the battery cover and housing assembly has a steady structure, and the battery cover assembly is convenient to open and close.

Other advantages and novel features will become more apparent from the following detailed description when taken in conjunction with the accompanying drawings.

BRIEF DESCRIPTION OF THE DRAWINGS

Many aspects of the present battery cover assembly can be better understood with reference to the following drawings. The components in the drawings are not necessarily to scale, the emphasis instead being placed upon clearly illustrating the principles of the battery cover assembly. Moreover, in the drawings, like reference numerals designate corresponding parts throughout the several views.

DETAILED DESCRIPTION OF THE PREFERRED EMBODIMENTS

The present battery cover assembly 1 is suitable for portable electronic devices such as mobile phones, PDAs and so on having a separable component like a battery or a battery module.

Figure 1:
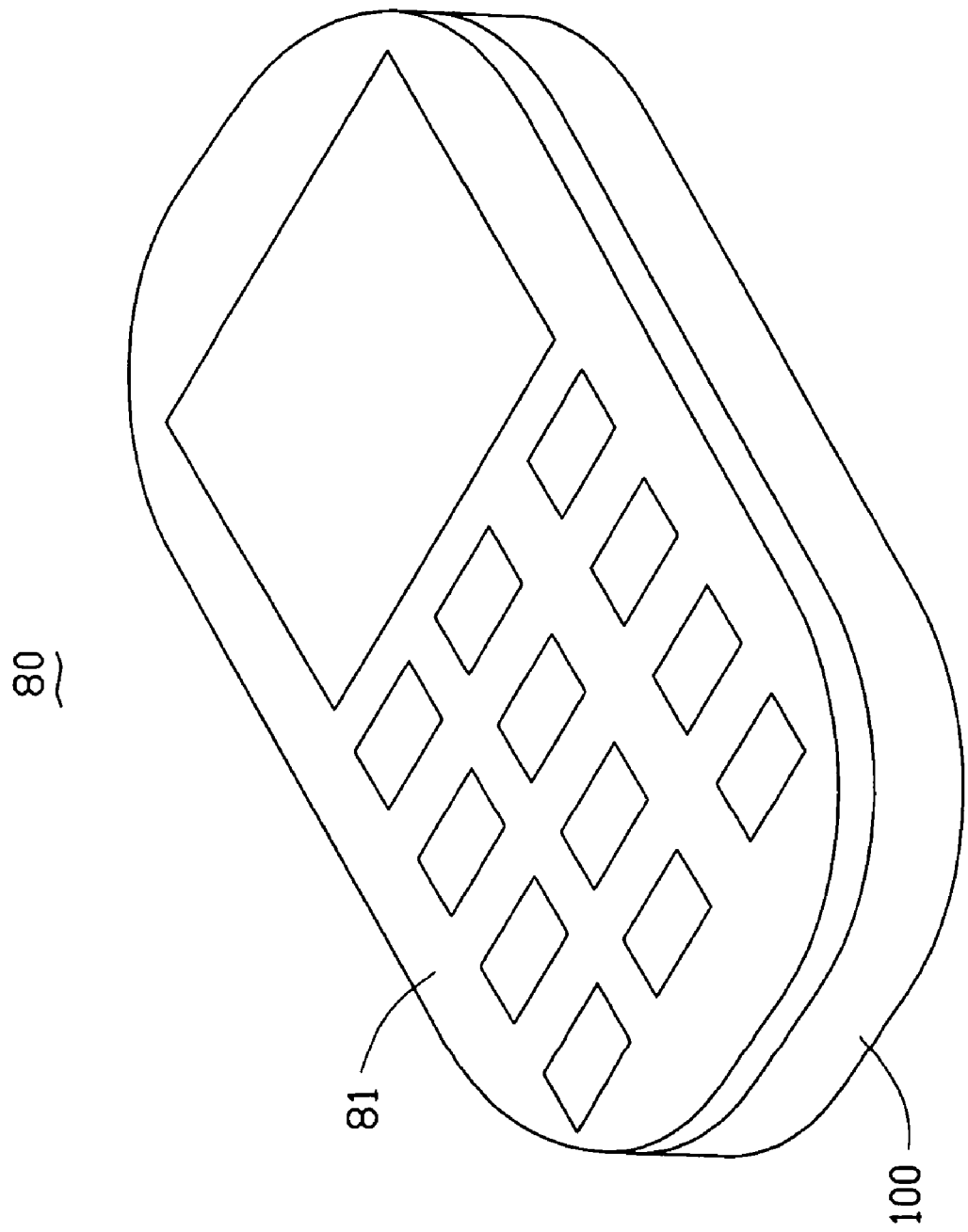
FIG. 1 is an isometric view of a mobile phone including a main housing and a battery cover assembly, in accordance with a preferred embodiment of the present battery cover assembly.
Figure 2:
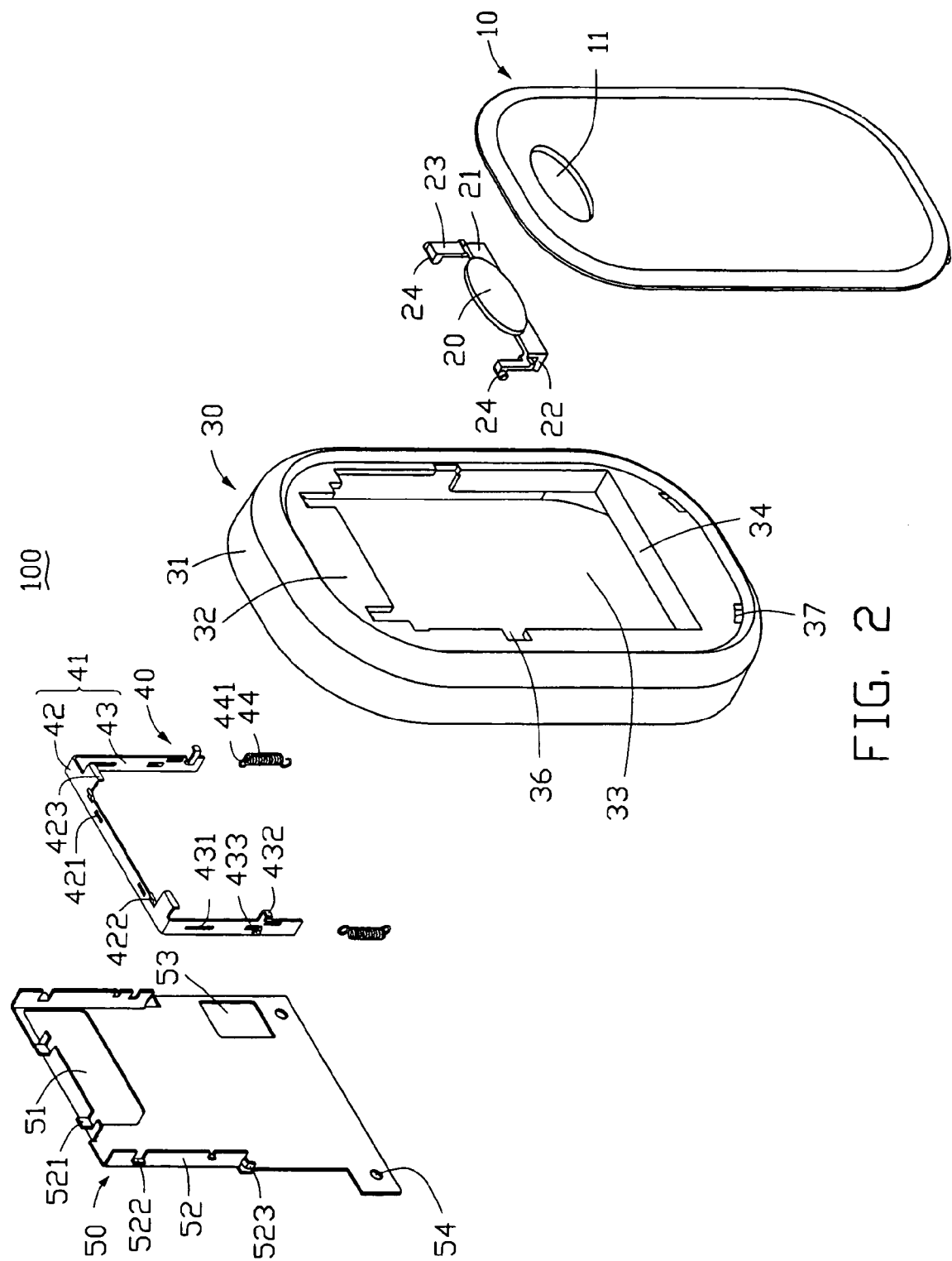
FIG. 2 is an exploded, isometric view of a battery cover assembly and a housing of a portable electronic device, in accordance with a preferred embodiment.
Figure 3:
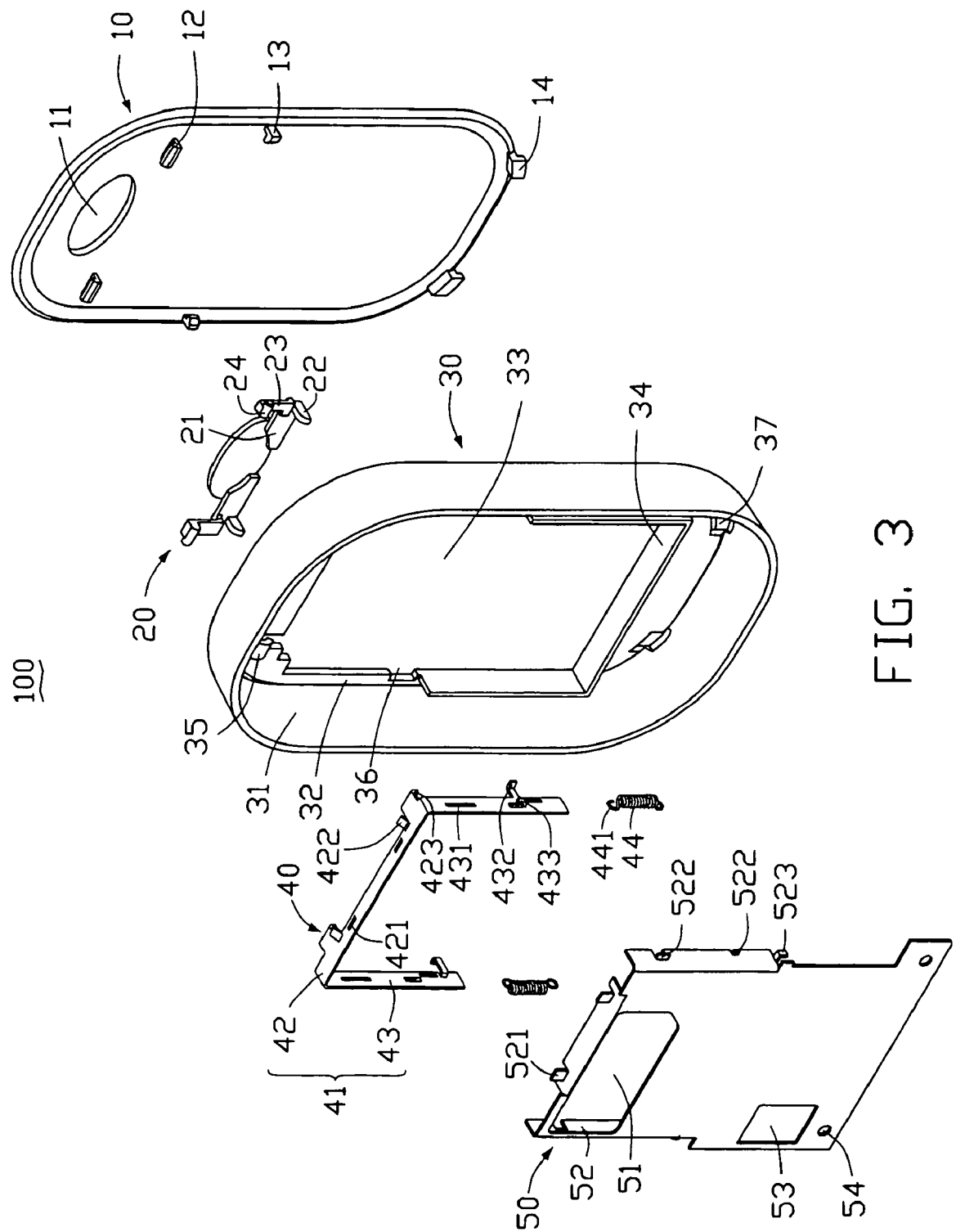
FIG. 3 is similar to FIG. 2, but viewed from another aspect.

Referring now to the drawings in detail, FIGS. 2-5 show a battery cover assembly 100 for use in a mobile phone 80 (shown in FIG. 1) according to a preferred embodiment. The mobile phone 80 is taken here as an exemplary application, for the purposes of describing details of the battery cover assembly 100. Referring to FIG. 1, the mobile phone 80 includes a main housing or console 81 and the battery cover assembly 100 attached to each other to commonly define a space for receiving a plurality of electronic components, such as a printed circuit board, a battery and so on, therein. The battery cover assembly 100 includes a cover 10, a button 20, a housing 30, a fixing assembly 40, and a base board 50.

The cover 10 can be a single piece of shaped sheet material. The cover 10 includes a button slot 11, a pair of front claws 12, a pair of central claws 13, and a pair of latches 14. The button slot 11 and the front claws 12 are generally disposed at a first end portion of the cover 10. The front claws 12 symmetrically extend from an inside surface of the cover 10 at the first end portion thereof. Each front claw 12 has a hooklike projection bending upwardly. The central claw 13 symmetrically extend from two opposite edge of the inside surface at a central portion of the cover 10. Each central claw 13 has a hook-shaped projection, bending inward toward the cover. An end of each front claws 12 and central claws 13 is chamfered, in order to facilitate installation of the cover 10. The latches 14 symmetrically extend downwardly from an edge of a second opposite end portion of the cover 10.

The button 20 has a main surface slightly smaller than the button slot 10. A pair of cantilevers 21 symmetrically extends, respectively, from two opposite edges of an opposite surface of the button 20, relative to the main surface thereof. A wedge block 22 extends perpendicularly to the main surface from a bottom portion of an outside end of each cantilever 21. An arm 23 extends upwardly immediately on top of the wedge blocks 22. Each top end of the arm 23 has an axis 24 protruding in a direction opposite the main surface.

The housing 30 can, for example, be a part of a mobile phone body of the mobile phone 80. The housing 30 includes a sidewall 31 and a frame board 32 surrounded peripherally by the sidewall 31. The frame board 32 separates a first cavity configured for receiving the cover 10 from a second cavity configured for receiving both of the fixing assembly 40 and the base board 50. The second cavity can further receive electronic elements, such as printed circuit boards (PCBs), of the mobile phone 80. The frame board 32 defines a receptacle 33 in a middle portion thereof. The frame board 32 has three frame board sidepieces 34 around a bottom portion of receptacle 33. The frame board sidepieces 34 are perpendicularly bent, relative to the second cavity and the main portion of the frame board 32, from a bottom portion of the frame board 32. It is to be also understood that frame board 32 could instead be molded so as to have frame board sidepieces 34 that are orthogonal both to the second cavity and to the main portion of the frame board 32. A pair of elastic arched pieces 35, configured for receiving the axes 24 of the button 20, extends symmetrically from a top of portion of the frame board 32. Each arched piece 35 bends arcuately toward the first cavity, thereby each defining an axial slot therein and a gap communicating with the axial slot between the two ends thereof The diameter of the axial slot is equal to that of the axis 24, while the width of the gap is smaller than the diameter of the axis 24. A pair of notches 36 communicating with the receptacle 33, is defined symmetrically and generally centrally at two opposite edges of the frame board 32, immediately on top of the frame board sidepiece 34. A pair of latch slots 37 is defined in the bottom portion of the frame board 32. Such latch slots 37 are configured for engageably receiving the latches 14 of the cover 10.

The fixing assembly 40 includes a sliding frame 41 and a pair of springs 44. The sliding frame 41 has a generally inverted 'U' shape and is elastic in nature. The sliding frame 41 includes two opposite side legs 43 and a transverse beam 42 perpendicularly interconnecting the respective top ends of the side legs 43. A pair of grooves 421 is symmetrically defined in the transverse beam 42. A pair of slant tabs 422, which corresponds to the wedge blocks 22 of the button 20, extends from an edge of the transverse beam 42, and each slant tab 422 is bent aslant upwardly. A pair of top clasps 423, which corresponds to the front claw 12 of the cover 10, extends from the same edge of the transverse beam 42 immediately outside the slant tab 422. Two tracks 431 are respectively defined in each side leg 43. A side clasp 432 extends from an edge of each side leg 43, in a same direction along which the top clasps 423 extend, and the side clasps 432 cooperate with the central claws 13 of the cover 10. A first catch 433 is formed on an outside of each side leg 43 between the two tracks 431. Each first catch 433 has a vertical portion that is upwardly bent or otherwise so formed and thus generally oriented toward the transverse beam 32.

The two springs 44 are helical and compressible. Each spring 44 has a hook 441 at each of opposite ends thereof.

The base board 50 can be a generally rectangular plate and has a similar profile with the receptacle 33 of the housing 30. The base board 50 has an aperture 51 defined therein that is configured for receiving, e.g., a SIM (subscriber identity module) card. A rectangular cutout 53 and two holes 54 are defined in the base board 50 to accommodate other components of the mobile phone. A sidepiece 52 is disposed at a peripheral portion of the base board 50. The sidepiece 52 includes two side portions, perpendicularly bent or, e.g., molded from two opposite long sides of the base board 50, and a top portion, perpendicularly bent or otherwise formed as such from a top side of the base board 50. A pair of inserting pieces 521, configured for cooperatively mating with the pair of grooves 421 of the sliding frame 41, is perpendicularly formed on the top portion of the sidepiece 52. A pair of tabs 522 is formed on each side portion of the sidepiece 52. The tabs 522 correspond to and are insertable in the tracks 431 of the sliding frame 41. The width of the tabs 522 is less than the length of the tracks 431, thereby facilitating limited movement between the fixing assembly 40 and the base board 50. A second catch 523 is formed on a bottom of each side portion of the sidepiece 52. Each second catch 423 has a vertical portion that is bent/directed downwardly (i.e., in same direction as the corresponding side leg 43).

Figure 4:
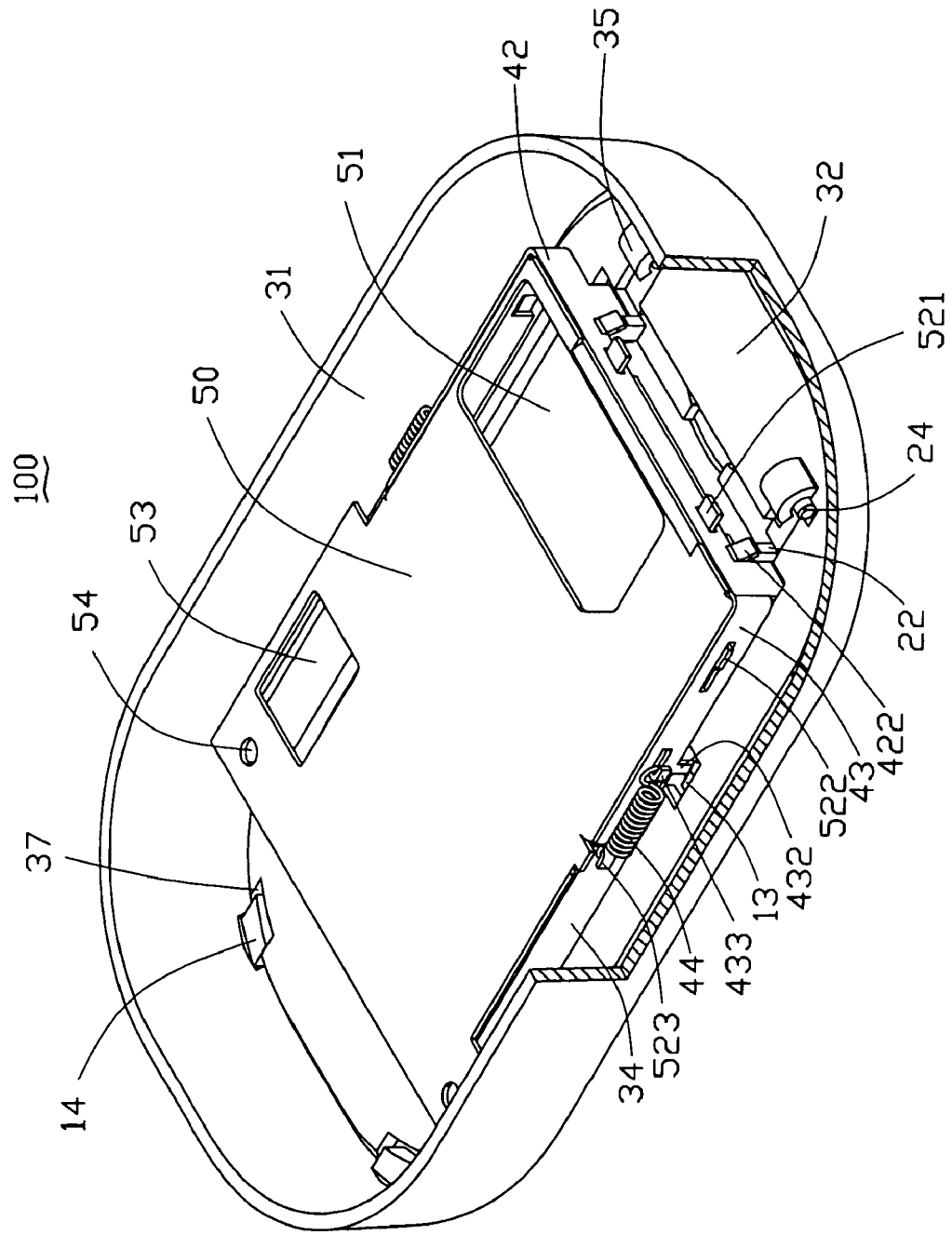
FIG. 4 is an assembled, partially cut-away view of FIG. 3.
Figure 5:
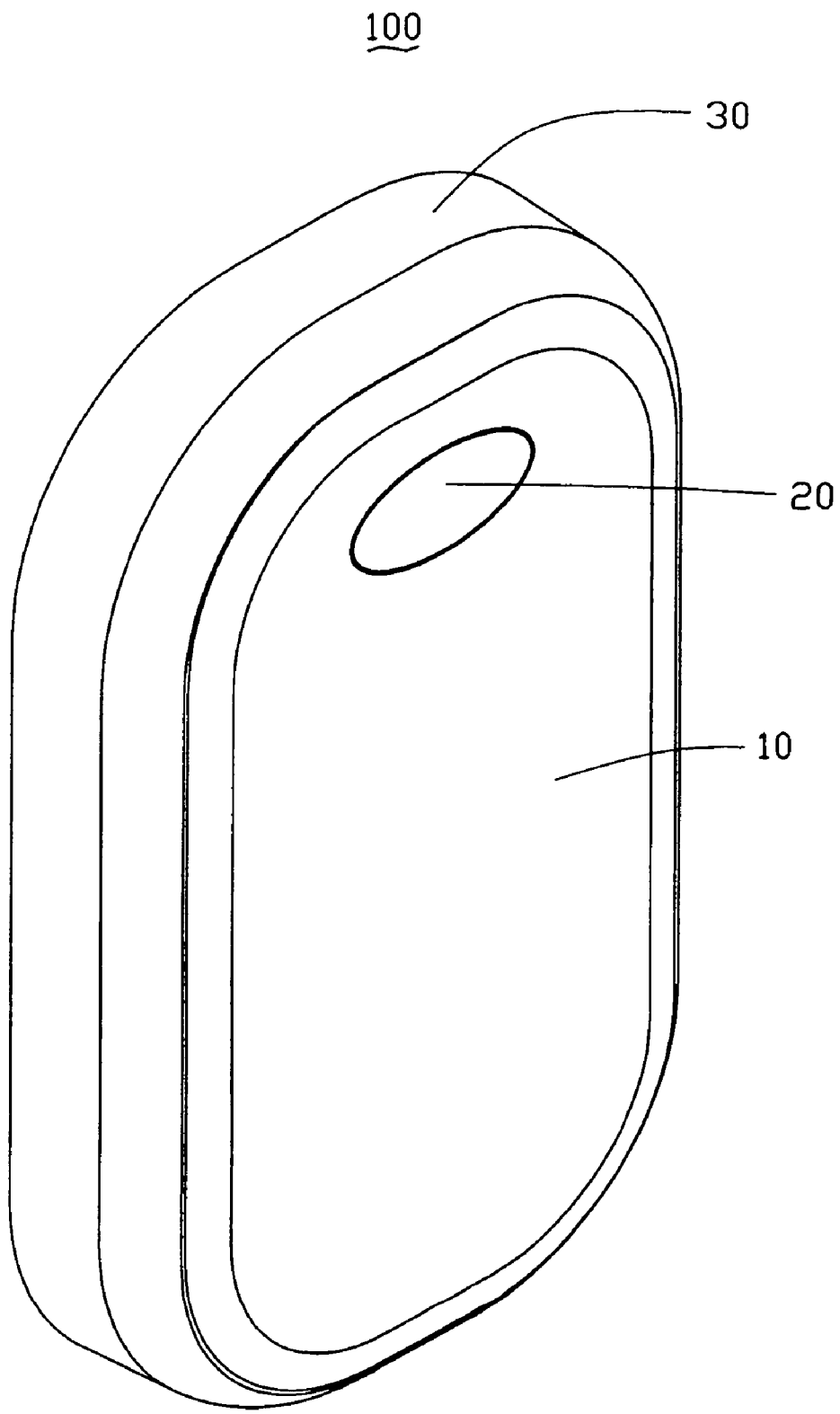
FIG. 5 is an assembled view of FIG. 3, but viewed from another aspect.

Referring to FIGS. 4-5, a process of assembling the battery cover assembly 100 is as follows. Firstly, the base board 50 is received in the second cavity of the housing 30 and fixed to the housing 30 by conventional methods such as adhering or welding. For example, the side portion of the sidepiece 52 and a bottom side of the top portion of the sidepieces 52 are adhered with the frame board 32 around a top portion of the receptacle 33, and a bottom peripheral portion of the base board 50 is adhered with the frame board sidepiece 34 of the frame board 32. As such, a battery receiving cavity is formed and thereby defined by the base board 50 and the frame board 32 therebetween, in order to receive a battery or a battery package. Next, the fixing assembly 40 is mounted to the base board 50. The transverse beam 42 and the side legs 43 of the sliding frame 41 of the fixing assembly 40, respectively, abut the top portion and the side portion of the sidepieces 52 of the base board 50. The inserting pieces 521 are received in the grooves 421 of the sliding frame 41. The tabs 522 of the base board 50 are slidably received in the tracks 431 of the sliding frame 41, respectively. Thus, the sliding frame 41 is slidably movable relative to the base board 50. The top clasps 422 of the sliding frame 42 are exposed in the first cavity of the housing 30. The side clasps 432 respectively extend through the notches 36 and are exposed in the first cavity of the housing 30. Then, the springs 44 are installed on the sliding frame 41 and the base board 50. The springs 44 are first stretched, and then the hooks 441 of each spring 44 are respectively engaged on one first catch 432 of the sliding frame 41 and one second catch 523 of the base board 50. Finally, the button 20 is attached to the housing 30. The axes 24 of the button 20 are respectively mated with the arched pieces 35 of the housing 30, each is inserted into a respective axial slot from a respective gap. The wedged blocks 22 of the button 20 respectively cooperate with the slanted tab 422 of the sliding frame 41.

When attaching the cover 10 onto the housing 30, initially, the latches 14 of the cover 10 are inserted into the latch slots 37 of the housing 30. Then, the cover 10 is pushed toward the housing 30. The front claws 12 and the central claws 13 of the cover 10 are respectively engaged with the top clasps 423 and the side clasps 432 of the sliding frame 41, and the main surface of the button 20 extends through the button slot 11 and protrudes out of the cover 10. The cover 10 is thereby assembled onto the housing 30.

When detaching the cover 10 from the housing 30, the button 20 is pushed by a user. The button 20 rotates toward the housing 30 via the axes 24, and the wedge blocks 22 force the slanted tabs 422 of the sliding frame 41 to slide upwardly along a slanted surface of the wedge blocks 22. Thus, the sliding frame 41, of which the slanted tabs 422 is a part, is forced to slide relative to the base board 50 and the cover 10. Jointly, the springs 44 are further stretched, and the top clasps 423 and the side clasps 432 of the sliding frame 41 respectively become disengaged from the front claws 12 and the central claws 13 of the cover 10. Thereby, the cover 10 can be readily detached from the housing 30. Finally, the cover 10 is taken away from the housing 30 by the user. Thereupon, the springs 44 rebound/contracts, causing the sliding frame 41 to return to its original position relative to the base board 50.

In other exemplary embodiments, the springs 44 can be replaced by other elastic members, such as rubber bars. The sliding frame 41 is not limited to having an inverted 'U' shape. For example, the sliding frame 41 could instead by a rectangular plate with suitable holes, slots and hooks. The width of axial slot of the arched pieces 35 can be larger than the diameter of the axes 24, and the arms 23 of the button are advantageously made of an elastic material. Thus, the axes 24 could be adhered or welded to the arched pieces 35. The arms 23 would bend toward the base board 50 when the button 20 is pressed by a user, and would rebound to its original position relative to the base board 50 after the user stops pressing the button 20. The base board 50 and the housing 30 can be manufactured as a unitary whole or manufactured separately.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A battery cover assembly configured for use in a portable electronic device, the battery cover assembly comprising:
    a housing comprising:
        a frame board having a receptacle defined in a middle portion thereof, and
        a pair of latch slots defined in a bottom portion of the frame board;
    a base board fixed to the housing, the base board and the housing together defining a receiving cavity therebetween;
    a fixing assembly comprising:
        a sliding frame slidably attached on the base board, the sliding frame including a plurality of clasps; and
        an elastic member, one end of the elastic member being attached to the base board and the other end attached to the sliding frame;
    a cover removably attached to the housing, the cover comprising:
        a button slot defined therein,
        a plurality of claws corresponding to and configured for engagement with the clasps of the fixing assembly, each claw being disposed on an inner surface of the cover; and
        a pair of latches corresponding to and configured for operatively mating with the latch slots of the housing; and
    a button mounted to the housing and cooperating with the sliding frame, the button extending through the button slot so as to be exposed to a user.

2. The battery cover assembly as claimed in claim 1, wherein the sliding frame comprises two opposite side legs and a transverse beam perpendicularly interconnecting top ends of the side legs.

3. The battery cover assembly as claimed in claim 2, wherein the clasps comprise a pair of top clasps formed on the transverse beam and a side clasp formed on each side leg.

4. The battery cover assembly as claimed in claim 2, wherein the transverse beam has a pair of grooves defined therein and a pair of slanted tabs extending from one edge thereof; each side leg having two tracks defined therein.

5. The battery cover assembly as claimed in claim 4, wherein the base board includes a sidepiece, a pair of inserting piece, a pair of tabs and a pair of second catches; the sidepiece comprising a side portion formed on each side of the base board and a top portion formed on the top of the base board; the inserting pieces being disposed on the top portion of the sidepiece, respectively inserting in the grooves of the sliding frame; a pair of tabs being located on each side portion of the sidepiece, respectively inserting in the tracks of the sliding frame; the second catches being formed on the side portions of the sidepiece and fixed to the elastic member.

6. The battery cover assembly as claimed in claim 4, wherein the button includes two cantilevers respectively extending from two opposite edges thereof; two arms formed on the cantilevers; two axes respectively defined on the arms; and two wedge blocks abutting against the respective slanted tabs of the side legs.

7. The battery cover assembly as claimed in claim 1, wherein the housing comprises a side wall peripherally surrounding the frame board; a frame board sidepiece perpendicular to the frame board; and a pair of arched pieces formed on the frame board; the button including a pair of axes extending therefrom, each arched piece being fixed to a respective axis of the button.

8. The battery cover assembly as claimed in claim 7, wherein the arched pieces are each bent arcuately and thereby define an axial slot therein.

9. The battery cover assembly as claimed in claim 1, wherein the elastic member is a spring, the spring being helical and compressible, the spring having a hook at each opposite end thereof.

10. The battery cover assembly as claimed in claim 1, wherein the base board comprises an aperture configured for receiving a subscriber identity system card and a plurality of holes configured for cooperating with other members of the portable electronic device.

11. A portable electronic device, comprising:
    a main console configured for carrying at least one operative component of the portable electronic device; and
    a battery cover assembly configured for carrying a battery, the battery being configured for supplying power to each operative component of the portable electronic device, the battery cover assembly comprising:
        a housing comprising:
            a frame board having a receptacle defined in a middle portion thereof; and
            a pair of latch slots defined in a bottom portion of the frame board;
        a base board fixed to the housing, the base board and the housing together defining a receiving cavity therebetween;
        a fixing assembly comprising:
            a sliding frame slidably attached on the base board, the sliding frame including a plurality of clasps; and
            an elastic member, one end of the elastic member being attached to the base board and the other end attached to the sliding frame;
        a cover removably attached to the housing, the cover comprising:
            a button slot defined therein,
            a plurality of claws corresponding to and configured for engagement with the clasps of the fixing assembly, each claw being disposed on an inner surface of the cover; and
            a pair of latches corresponding to and configured for operatively mating with the latch slots of the housing, and
        a button mounted to the housing and cooperating with the sliding frame, the button extending through the button slot so as to be exposed to a user.

* * * * *